(12) United States Patent
Jol et al.

(10) Patent No.: US 8,931,962 B2
(45) Date of Patent: Jan. 13, 2015

(54) DUAL ORIENTATION CONNECTOR WITH SIDE CONTACTS

(75) Inventors: Eric S. Jol, San Jose, CA (US); Mathias Schmidt, Mountain View, CA (US); Albert Golko, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 13/704,236

(22) PCT Filed: Jun. 20, 2011

(86) PCT No.: PCT/US2011/041127
§ 371 (c)(1),
(2), (4) Date: Dec. 13, 2012

(87) PCT Pub. No.: WO2011/160138
PCT Pub. Date: Dec. 22, 2011

(65) Prior Publication Data
US 2013/0089291 A1   Apr. 11, 2013

Related U.S. Application Data

(60) Provisional application No. 61/356,499, filed on Jun. 18, 2010.

(51) Int. Cl.
*G02B 6/36* (2006.01)
*H01R 24/00* (2011.01)
(Continued)

(52) U.S. Cl.
CPC ............. *H01R 24/00* (2013.01); *H01R 13/405* (2013.01); *H01R 13/6471* (2013.01); *G02B 6/36* (2013.01); *H01R 13/642* (2013.01); *H01R 2107/00* (2013.01); *H01R 24/60* (2013.01)

USPC ............................................................ 385/77

(58) Field of Classification Search
CPC ......................................................... G02B 6/38
USPC ............................................................ 385/77
See application file for complete search history.

(56) References Cited

U.S. PATENT DOCUMENTS 2,792,557 A    5/1957  Dowick
2,892,990 A *  6/1959  Werndl .......................... 439/265

(Continued)

FOREIGN PATENT DOCUMENTS

CN   1397804       2/2003
CN   1830122  A    9/2006

(Continued)

OTHER PUBLICATIONS

International Preliminary Report on Patentability for International PCT Application No. PCT/US2011/041127, mailed Jan. 3, 2013, 8 pages.

(Continued)

*Primary Examiner* — Jerry Blevins
(74) *Attorney, Agent, or Firm* — Kilpatrick Townsend & Stockton LLP

(57) ABSTRACT

The present disclosure relates generally to connectors such as audio connectors and in particular to a dual orientation audio connector with side audio contacts that can be used in place of standard audio connectors. The connector has an intuitive insertion orientation and a smooth, consistent feel when inserted and extracted from its corresponding receptacle connector. A corresponding connector jack may be configured to receive the dual orientation audio connector.

24 Claims, 13 Drawing Sheets

(51) Int. Cl.
*H01R 13/405* (2006.01)
*H01R 13/6471* (2011.01)
*H01R 13/642* (2006.01)
*H01R 107/00* (2006.01)
*H01R 24/60* (2011.01)

(56) References Cited

U.S. PATENT DOCUMENTS

| | | | |
|---|---|---|---|
| 3,760,335 A | 9/1973 | Roberts | |
| 3,793,614 A | 2/1974 | Tachick et al. | |
| 3,795,037 A | 3/1974 | Luttmer | |
| 4,361,375 A | 11/1982 | Bailey et al. | |
| 4,558,912 A | 12/1985 | Coller et al. | |
| 4,621,882 A | 11/1986 | Krumme | |
| 4,711,506 A | 12/1987 | Tanaka | |
| 5,040,994 A | 8/1991 | Nakamoto et al. | |
| 5,256,074 A | 10/1993 | Tan | |
| 5,295,843 A | 3/1994 | Davis et al. | |
| 5,380,225 A | 1/1995 | Inaoka | |
| 5,387,110 A | 2/1995 | Kantner et al. | |
| 5,442,243 A | 8/1995 | Bailey | |
| 5,554,042 A | 9/1996 | Denninger | |
| 5,594,284 A | 1/1997 | Hill et al. | |
| 5,785,557 A | 7/1998 | Davis | |
| 5,959,848 A | 9/1999 | Groves et al. | |
| 5,967,833 A | 10/1999 | Cachina | |
| 6,074,225 A | 6/2000 | Wu et al. | |
| 6,086,421 A | 7/2000 | Wu et al. | |
| 6,113,427 A | 9/2000 | Wu | |
| 6,179,627 B1 | 1/2001 | Daly et al. | |
| 6,231,396 B1 | 5/2001 | Huang | |
| 6,322,394 B1 | 11/2001 | Katoh et al. | |
| 6,364,699 B1 | 4/2002 | Hwang et al. | |
| 6,410,857 B1 | 6/2002 | Gonya | |
| 6,482,045 B2 | 11/2002 | Arai | |
| 6,530,793 B2 | 3/2003 | Eichhorn et al. | |
| 6,692,311 B1 | 2/2004 | Kamei et al. | |
| 6,786,763 B2 | 9/2004 | Wu | |
| 6,846,202 B1 | 1/2005 | Schmidt et al. | |
| 6,869,320 B2 | 3/2005 | Haas et al. | |
| 6,902,432 B2 | 6/2005 | Morikawa et al. | |
| 6,948,965 B2 | 9/2005 | Kumamoto et al. | |
| 6,948,983 B1 | 9/2005 | Peng | |
| 6,948,984 B2 | 9/2005 | Chen et al. | |
| 6,962,510 B1 | 11/2005 | Chen et al. | |
| 6,964,582 B2 | 11/2005 | Zhuang et al. | |
| 6,981,887 B1 | 1/2006 | Mese et al. | |
| 7,021,971 B2 | 4/2006 | Chou et al. | |
| 7,040,919 B2 | 5/2006 | Yao | |
| 7,074,052 B1 | 7/2006 | Ni et al. | |
| 7,094,086 B2 | 8/2006 | Teicher | |
| 7,094,089 B2 | 8/2006 | Andre et al. | |
| 7,160,125 B1 | 1/2007 | Teicher | |
| 7,175,444 B2 | 2/2007 | Lang et al. | |
| 7,198,522 B1 | 4/2007 | Ho et al. | |
| 7,249,978 B1 | 7/2007 | Ni | |
| 7,361,059 B2 | 4/2008 | Harkabi et al. | |
| 7,363,947 B2 | 4/2008 | Teicher | |
| 7,364,445 B1 | 4/2008 | Ni et al. | |
| 7,387,539 B2 | 6/2008 | Trenne | |
| 7,396,257 B2 | 7/2008 | Takahashi | |
| 7,407,416 B1 | 8/2008 | Rogers et al. | |
| 7,435,107 B2 | 10/2008 | Masumoto et al. | |
| 7,440,286 B2 | 10/2008 | Hiew et al. | |
| 7,442,091 B2 | 10/2008 | Salomon et al. | |
| 7,458,825 B2 | 12/2008 | Atsmon et al. | |
| 7,500,861 B2 | 3/2009 | Harkabi et al. | |
| 7,537,471 B2 | 5/2009 | Teicher | |
| 7,549,896 B2 | 6/2009 | Zhang et al. | |
| 7,559,805 B1 | 7/2009 | Yi et al. | |
| 7,572,153 B2 | 8/2009 | Trenne | |
| 7,591,657 B2 | 9/2009 | Teicher | |
| 7,594,827 B2 | 9/2009 | Takamoto et al. | |
| 7,695,318 B1 | 4/2010 | Wang et al. | |
| 7,716,400 B2 | 5/2010 | Raines | |
| 7,717,717 B1 | 5/2010 | Lai | |
| 7,722,409 B2 | 5/2010 | Takamoto et al. | |
| 7,727,027 B2 | 6/2010 | Chiang et al. | |
| 7,740,498 B1 | 6/2010 | Orsley | |
| 7,841,894 B2 | 11/2010 | Gong et al. | |
| 7,872,873 B2 | 1/2011 | Hiew et al. | |
| 7,892,014 B2 | 2/2011 | Amidon et al. | |
| 7,918,685 B1 | 4/2011 | Kruckenberg | |
| 8,007,309 B2 | 8/2011 | Fan | |
| 8,062,073 B1 | 11/2011 | Szczesny et al. | |
| 8,162,696 B2 | 4/2012 | Elbaz et al. | |
| 8,246,388 B2 | 8/2012 | Chen et al. | |
| 8,277,258 B1 | 10/2012 | Huang et al. | |
| 8,282,417 B2 | 10/2012 | Xiao | |
| 8,287,299 B2 | 10/2012 | Ray et al. | |
| 8,461,465 B2 | 6/2013 | Golko et al. | |
| 8,517,751 B1 | 8/2013 | Golko et al. | |
| 8,517,766 B2 | 8/2013 | Golko et al. | |
| 8,545,269 B2 | 10/2013 | Ore-Yang | |
| 8,561,879 B2 | 10/2013 | Jol et al. | |
| 8,573,995 B2 | 11/2013 | Golko et al. | |
| 8,647,156 B2 | 2/2014 | Golko et al. | |
| 8,708,745 B2 | 4/2014 | Golko et al. | |
| 8,777,666 B2 | 7/2014 | Golko et al. | |
| 2001/0046809 A1 | 11/2001 | Chiran et al. | |
| 2003/0016509 A1 | 1/2003 | Tsukamoto | |
| 2003/0207606 A1 | 11/2003 | Ho | |
| 2004/0229515 A1 | 11/2004 | Kaneda et al. | |
| 2005/0042930 A1 | 2/2005 | Harkabi et al. | |
| 2005/0079738 A1 | 4/2005 | Ahn | |
| 2005/0085136 A1 | 4/2005 | Zhang | |
| 2005/0124217 A1 | 6/2005 | Zhuang et al. | |
| 2005/0124218 A1 | 6/2005 | Chen et al. | |
| 2005/0124219 A1 | 6/2005 | Chen et al. | |
| 2005/0202727 A1 | 9/2005 | Andre et al. | |
| 2006/0019545 A1 | 1/2006 | Moriyama et al. | |
| 2006/0024997 A1 | 2/2006 | Teicher | |
| 2006/0040549 A1 | 2/2006 | Yao | |
| 2006/0148300 A1 | 7/2006 | Huang et al. | |
| 2006/0216991 A1 | 9/2006 | Boutros | |
| 2006/0289201 A1 | 12/2006 | Kim et al. | |
| 2007/0010115 A1 | 1/2007 | Teicher | |
| 2007/0010116 A1 | 1/2007 | Teicher | |
| 2007/0037452 A1* | 2/2007 | Martin et al. | 439/638 |
| 2007/0049100 A1 | 3/2007 | Tsai | |
| 2007/0072442 A1 | 3/2007 | DiFonzo | |
| 2007/0082701 A1 | 4/2007 | Seil et al. | |
| 2007/0178771 A1 | 8/2007 | Goetz et al. | |
| 2007/0202725 A1 | 8/2007 | Teicher | |
| 2007/0243726 A1 | 10/2007 | Trenne | |
| 2008/0032562 A1 | 2/2008 | McHugh et al. | |
| 2008/0067248 A1 | 3/2008 | Hiew et al. | |
| 2008/0090465 A1 | 4/2008 | Matsumoto et al. | |
| 2008/0119076 A1 | 5/2008 | Teicher | |
| 2008/0119291 A1 | 5/2008 | Takamoto et al. | |
| 2008/0167828 A1* | 7/2008 | Terlizzi et al. | 702/64 |
| 2008/0274633 A1 | 11/2008 | Teicher | |
| 2008/0309313 A1 | 12/2008 | Farrar et al. | |
| 2009/0004923 A1 | 1/2009 | Tang et al. | |
| 2009/0108848 A1 | 4/2009 | Lundquist | |
| 2009/0117768 A1 | 5/2009 | Liao | |
| 2009/0156027 A1 | 6/2009 | Chen | |
| 2009/0180243 A1 | 7/2009 | Lynch et al. | |
| 2010/0009575 A1 | 1/2010 | Crooijmans et al. | |
| 2010/0062656 A1* | 3/2010 | Lynch et al. | 439/669 |
| 2010/0104126 A1 | 4/2010 | Greene | |
| 2010/0171465 A1 | 7/2010 | Seal et al. | |
| 2010/0221936 A1 | 9/2010 | Zhao et al. | |
| 2010/0248544 A1 | 9/2010 | Xu et al. | |
| 2010/0254602 A1 | 10/2010 | Yoshino | |
| 2010/0254662 A1 | 10/2010 | He et al. | |
| 2010/0267261 A1 | 10/2010 | Lin et al. | |
| 2010/0267262 A1 | 10/2010 | Lin et al. | |
| 2011/0136381 A1 | 6/2011 | Cho | |
| 2011/0159719 A1 | 6/2011 | Takahashi et al. | |
| 2011/0201213 A1 | 8/2011 | Dabov et al. | |
| 2011/0250786 A1 | 10/2011 | Reid | |
| 2011/0294354 A1 | 12/2011 | Chen et al. | |
| 2011/0312200 A1 | 12/2011 | Wang et al. | |

(56) References Cited

U.S. PATENT DOCUMENTS

| | | |
|---|---|---|
| 2012/0028495 A1 | 2/2012 | Su et al. |
| 2013/0075149 A1 | 3/2013 | Golko et al. |
| 2013/0078869 A1 | 3/2013 | Golko et al. |
| 2013/0095701 A1 | 4/2013 | Golko et al. |
| 2013/0095702 A1 | 4/2013 | Golko et al. |
| 2013/0115821 A1 | 5/2013 | Golko et al. |
| 2013/0122754 A1 | 5/2013 | Golko et al. |
| 2013/0149911 A1 | 6/2013 | Golko et al. |
| 2013/0217253 A1 | 8/2013 | Golko et al. |
| 2013/0244491 A1 | 9/2013 | Sarwar et al. |
| 2013/0244492 A1 | 9/2013 | Golko et al. |
| 2014/0068933 A1 | 3/2014 | Brickner et al. |
| 2014/0069709 A1 | 3/2014 | Schmidt et al. |
| 2014/0073183 A1 | 3/2014 | Golko et al. |
| 2014/0073193 A1 | 3/2014 | SooHoo et al. |
| 2014/0170907 A1 | 6/2014 | Golko et al. |
| 2014/0206209 A1 | 7/2014 | Kamei et al. |

FOREIGN PATENT DOCUMENTS

| | | |
|---|---|---|
| CN | 201402871 Y | 2/2010 |
| CN | 101783466 A | 7/2010 |
| CN | 201533091 U | 7/2010 |
| DE | 196 09 571 | 11/1995 |
| DE | 20 2004 021354 | 9/2007 |
| EP | 0081372 | 6/1983 |
| EP | 1684391 A2 | 7/2006 |
| EP | 1717910 A2 | 11/2006 |
| EP | 2169774 A1 | 3/2010 |
| EP | 2 373 131 A1 | 10/2011 |
| FR | 2138961 | 1/1973 |
| JP | 2 078171 | 3/1990 |
| JP | 8321360 A | 12/1996 |
| JP | 2003-217728 A | 7/2003 |
| JP | 2004-079491 | 3/2004 |
| TW | M318831 U | 9/2007 |
| TW | M350153 U | 2/2009 |
| WO | 2004/097995 A1 | 11/2004 |
| WO | 2005/013436 A1 | 2/2005 |
| WO | 2005124932 A2 | 12/2005 |
| WO | 2006/013553 A2 | 2/2006 |
| WO | 2006/074348 A1 | 12/2006 |
| WO | 2008/065659 A2 | 6/2008 |
| WO | 2009/069969 A2 | 6/2009 |
| WO | 2009/140992 A1 | 11/2009 |
| WO | 2011043488 A1 | 4/2011 |
| WO | 2011150403 A1 | 12/2011 |
| WO | 2011163256 A1 | 12/2011 |
| WO | 2013070767 A1 | 5/2013 |
| WO | 2013082175 A2 | 6/2013 |

OTHER PUBLICATIONS

International Search Report and Written Opinion for International PCT Application No. PCT/US2012/054318, mailed on Oct. 25, 2012, 47 pages.
Extended European Search Report, EP App. No. 12191619.1, Mailed Jul. 10, 2013, 13 pages.
International Search Report and Written Opinion for International PCT Application No. PCT/US2013/037233, mailed on Oct. 1, 2013, 14 pages.
Notice of Allowance for U.S. Appl. No. 13/607,366, mailed Oct. 31, 2013, 14 pages.
Office Action and Search Report for Taiwanese Application No. 100118944, mailed Sep. 16, 2013, 24 pages.
First Office Action, Australian Patent Application No. 2012101657; Mailed Dec. 14, 2012, 4 pages.
International Preliminary Report on Patentability for International PCT Application No. PCT/US2011/038452, mailed Dec. 13, 2012, 19 pages.
International Preliminary Report on Patentability for International PCT Application No. PCT/US2011/041286, mailed Jan. 10, 2013, 12 pages.
International Preliminary Report on Patentability for International PCT Application No. PCT/US2011/041290, mailed Jan. 10, 2013, 15 pages.
International Search Report and Written Opinion for International PCT Application No. PCT/CN2012/081257, mailed on Jun. 20, 2013, 11 pages.
International Search Report and Written Opinion for International PCT Application No. PCT/US2012/063944, mailed Apr. 18, 2013, 23 pages.
Non-Final Office Action for U.S. Appl. No. 13/679,991, mailed Apr. 5, 2013, 19 pages.
Non-Final Office Action for U.S. Appl. No. 13/679,992, mailed Apr. 9, 2013, 18 pages.
Notice of Allowance for U.S. Appl. No. 13/679,992, mailed Jun. 11, 2013, 17 pages.
Notice of Allowance for U.S. Appl. No. 13/679,991, mailed Jul. 10, 2013, 22 pages.
Notice of Allowance for U.S. Appl. No. 13/679,996, mailed Apr. 12, 2013, 30 pages.
Notice of Allowance for U.S. Appl. No. 13/720,822, mailed Apr. 8, 2013, 30 pages.
Partial Search Report for International PCT Application No. PCT/US2012/063944 (mailed with Invitation to Pay Fees), mailed Feb. 20, 2013, 59 pages.
Partial Search Report for International PCT Application No. PCT/US2012/066881 (mailed with Invitation to Pay Fees), mailed Mar. 25, 2013, 8 pages.
Partial Search Report, EP App. No. 12191619.1, Mailed Feb. 20, 2013, 6 pages.
Search and Examination Report for United Kingdom Patent Application No. 1220045.7, mailed on Mar. 15, 2013, 7 pages.
Written Opinion for International PCT Application No. PCT/US2011/038452, mailed on Oct. 26, 2011, 17 pages.
Non-Final Office Action for U.S. Appl. No. 13/607,366, mailed Jul. 11, 2013, 23 pages.
Ex Parte Quayle Office Action for U.S. Appl. No. 13/761,001, mailed Jul. 17, 2013, 10 pages.
International Search Report and Written Opinion for International PCT Application No. PCT/US2013/038008, mailed Aug. 15, 2013, 12 pages.
Notice of Allowance for U.S. Appl. No. 13/761,001 , mailed Sep. 10, 2013, 9 pages.
International Search Report and Written Opinion for International PCT Application No. PCT/US2012/066881, mailed Sep. 9, 2013, 19 pages.
Office Action for Australian Application No. 2012245184, mailed Nov. 6, 2013, 3 pages.
Non-Final Office Action for U.S. Appl. No. 13/607,566, mailed Dec. 6, 2013, 20 pages.
Office Action for Australian Application No. 2011257975, mailed Dec. 16, 2013, 6 pages.
Extended European Search Report, EP App. No. 13165892.4, mailed Dec. 20, 2013, 6 pages.
Office Action for Korean Patent Application No. 10-2012-0125751, mailed Jan. 22, 2014, 6 pages.
Office Action for Mexican Patent Application No. MX/a/2012/013857, mailed Feb. 6, 2014, 3 pages.
Office Action, Canadian Patent Application No. 2,794,906; Mailed Mar. 4, 2014, 2 pages.
Notice of Allowance for U.S. Appl. No. 13/607,566, mailed Mar. 11, 2014, 8 pages.
Extended European Search Report, EP App. No. 14152776.2, mailed Mar. 11, 2014, 9 pages.
Office Action for United Kingdom Application No. 1400243.0, mailed Mar. 12, 2014, 4 pages.
Flipper Press Release (Jun. 25, 2012) and Data Sheet: http://www.flipperusb.com/images/flipperUSB-brochure.pdf, http://www.flipperusb.com/images/flipperUSB-brochure.pdf.
International Search Report for International PCT Application No. PCT/US2011/038452, mailed on Oct. 26, 2011, 7 pages.
International Search Report and Written Opinion for International PCT Application No. PCT/US2011/041286, mailed on Oct. 20, 2011, 18 pages.

(56) References Cited

OTHER PUBLICATIONS

International Search Report and Written Opinion for International PCT Application No. PCT/US2011/041127, mailed on Dec. 29, 2011, 17 pages.
International Search Report and Written Opinion for International PCT Application No. PCT/US2011/041290, mailed on Nov. 21, 2011, 21 pages.
Office Action for Malaysian Patent Application No. PI2012005119, mailed on May 15, 2014, 4 pages.
International Preliminary Report on Patentability for International PCT Application No. PCT/US2012/063944, mailed May 22, 2014, 15 pages.
International Preliminary Report on Patentability for International PCT Application No. PCT/US2012/054318, mailed Jun. 12, 2014, 8 pages.
International Search Report and Written Opinion for International PCT Application No. PCT/US2012/066881, mailed Jun. 12, 2014, 14 pages.
Office Action for Chinese Patent Application No. 201310711187.1, mailed Jul. 14, 2014, 5 pages.
Office Action for Mexican Patent Application No. MX/a/2012/013857, mailed Jul. 23, 2014, 4 pages.
Final Office Action for U.S. Appl. No. 13/700,441, mailed Aug. 21, 2014, 9 pages.
European Search Report, EP App. No. 13195854.8, mailed Mar. 12, 2014, 7 pages.
International Preliminary Report on Patentability for International PCT Application No. PCT/US2012/066881, mailed Jun. 12, 2014, 14 pages.
Office Action for Korean Patent Application No. 10-2013-7001302, mailed Jun. 13, 2014, 9 pages.
Non-Final Office Action for U.S. Appl. No. 13/704,234, mailed Jul. 11, 2014, 6 pages.
Office Action for United Kingdom Patent Application No. 1220045.7, mailed on Mar. 7, 2014, 3 pages.
Office Action for Russian Application No. 2012157740, mailed Mar. 21, 2014, 5 pages.
Partial Search Report for International PCT Application No. PCT/US2014/012535 (mailed with Invitation to Pay Fees), mailed Apr. 4, 2014, 7 pages.
Non-Final Office Action for U.S. Appl. No. 13/700,441, mailed Apr. 10, 2014, 36 pages.
Office Action for Australian Application No. 2012245184, mailed Apr. 28, 2014, 3 pages.
Office Action for Korean Patent Application No. 10-2012-7034333, mailed Apr. 29, 2014, 6 pages.
Office Action for Taiwanese Patent Application No. 100121725, mailed May 1, 2014, 8 pages.
Office Action, Canadian Patent Application No. 2,800,738, mailed May 8, 2014, 2 pages.
Non-Final Office Action for U.S. Appl. No. 13/703,893, mailed May 9, 2014, 10 pages.
Office Action for Australian Application No. 2013204685, mailed Jul. 17, 2014, 2 pages.
Office Action for Korean Patent Application No. 10-2014-0048365, mailed Aug. 11, 2014, 4 pages.
Office Action for Australian Patent Application No. 2013205161, mailed Aug. 18, 2014, 4 pages.
Non-Final Office Action for U.S. Appl. No. 13/610,631, mailed Sep. 16, 2014, 28 pages.
Notice of Allowance for U.S. Appl. No. 13/703,893, mailed Sep. 16, 2014, 8 pages.
Office Action for Chinese Patent Application No. 201180030576.7, mailed Sep. 2, 2014, with English translation, 23 pages.

* cited by examiner

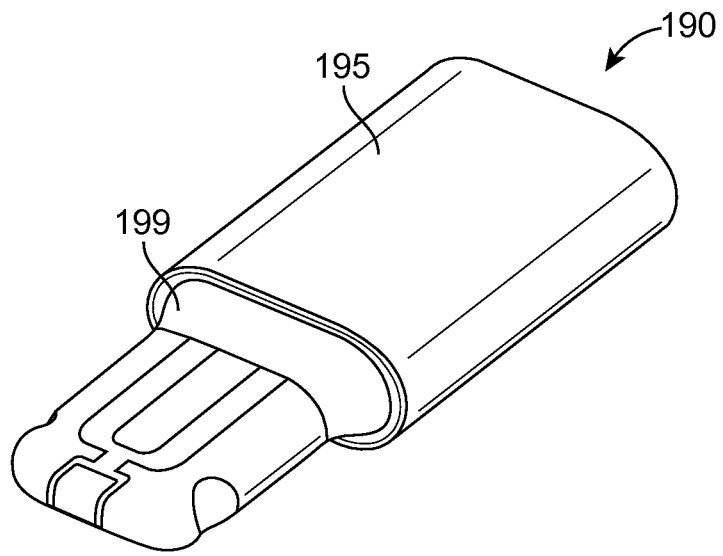
FIG. 6A
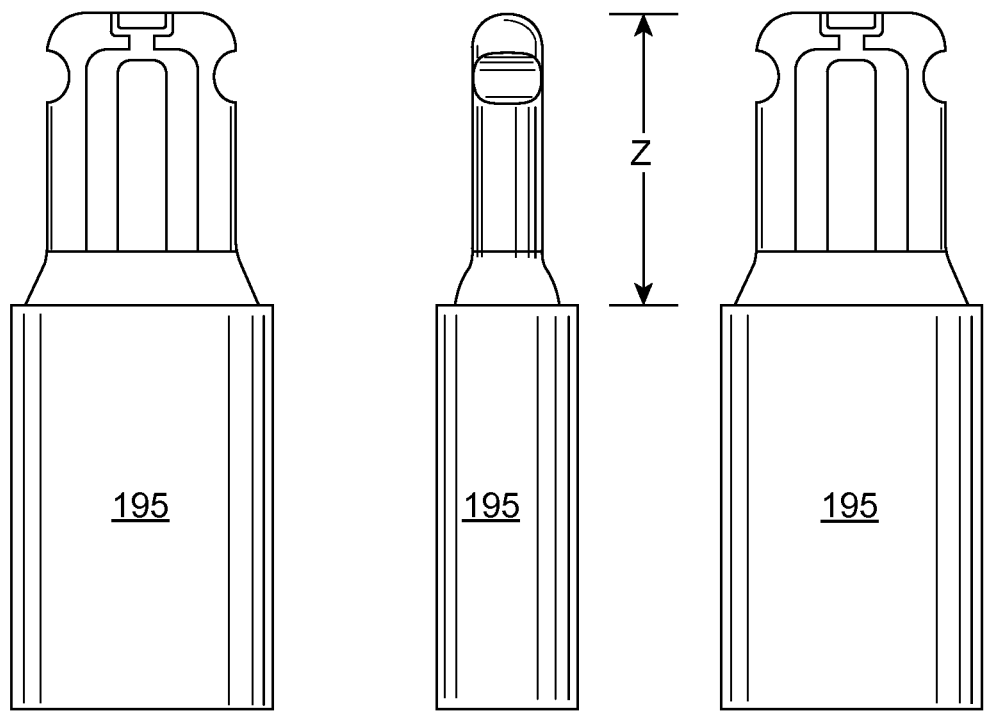
FIG. 6B  FIG. 6C  FIG. 6D

DUAL ORIENTATION CONNECTOR WITH SIDE CONTACTS

CROSS-REFERENCES TO RELATED APPLICATIONS

This application claims the benefit of U.S. Provisional Patent Application No. 61/356,499 filed Jun. 18, 2010, which is hereby incorporated by reference herein in its entirety.

FIELD OF INVENTION

The present invention relates generally to connectors such as audio connectors and in particular to a dual orientation audio connector with external side audio contacts that can be used in place of standard audio connectors currently used.

BACKGROUND OF THE INVENTION

Standard audio connectors or plugs are available in three sizes according to the outside diameter of the plug: a 6.35 mm (¼") plug, a 3.5 mm (⅛") miniature plug and a 2.5 mm (3/32") subminiature plug. The plugs include multiple conductive regions that extend along the length of the connectors in distinct portions of the plug such as the tip, sleeve and one or more middle portions between the tip and sleeve resulting in the connectors often being referred to as TRS (tip, ring and sleeve) connectors.

FIGS. 1A and 1B illustrate examples of audio plugs 10 and 20 having three and four conductive portions, respectfully. As shown in FIG. 1A, plug 10 includes a conductive tip 12, a conductive sleeve 14 and a conductive ring 16 electrically isolated from the tip 12 and the sleeve 14 by insulating rings 17 and 18. The three conductive portions 12, 14, 16 are for left and right audio channels and a ground connection. Plug 20, shown in FIG. 1B, includes four conductive portions: a conductive tip 22, a conductive sleeve 24 and two conductive rings 25, 26 and is thus sometimes referred to as a TRRS (tip, ring, ring, sleeve) connector. The four conductive portions are electrically isolated by insulating rings 27, 28 and 29 and are typically used for left and right audio, microphone and ground signals.

When plugs 10 and 20 are 3.5 mm miniature connectors, the outer diameter of conductive sleeve 14, 24 and conductive rings 16, 25, 26 is 3.5 mm and the insertion length of the connector is 14 mm. For 2.5 mm subminiature connectors, the outer diameter of the conductive sleeve is 2.5 mm and the insertion length of the connector is 11 mm long. Such TRS and TRRS connectors are used in many commercially available MP3 players and smart phones as well as other electronic devices. Electronic devices such as MP3 players and smart phones are continuously being designed to be thinner and smaller and/or to include video displays with screens that are pushed out as close to the outer edge of the devices as possible. The diameter and length of current 3.5 mm and even 2.5 mm audio connectors are limiting factors in making such devices smaller and thinner and in allowing the displays to be larger for a given form factor.

Some manufacturers have used USB, mini-USB and micro-USB connectors as audio connectors to connect headphones and similar audio components to electronic devices. FIG. 2 is an example of a micro-USB connector 30, the smallest of the USB connectors. Connector 30 includes an outer housing 32 and a metallic shell 34 that is inserted into a corresponding receptacle connector. Shell 34 defines an interior cavity 38 and includes five contacts 36 formed within the cavity. The insertable shell portion 34 of connector 30 is both thinner and shorter than even the 2.5 mm subminiature version of connectors 10 and 20. Connector 30, however, suffers from other drawbacks that detract from the overall user experience. For example, connector 30 must be inserted into its respective receptacle connector in a particular orientation, yet it is difficult for the user to determine when connector 30 is oriented in the correct insertion position. Also, even when connector 30 is properly aligned, the insertion and extraction of the connector is not precise, has an inconsistent feel and, even when the connector is fully inserted, has an undesirable degree of wobble that may result in either a faulty connection or breakage. Additionally, cavity 38 is prone to collecting and trapping debris within the cavity which may interfere with the signal connections.

BRIEF SUMMARY OF THE INVENTION

In view of the shortcomings in currently available audio connectors as described above, the present invention provides a dual orientation plug connector with ground contacts on first and second major opposing sides and side signal contacts. Some embodiments of the connector have a reduced plug length, an intuitive insertion orientation and a smooth, consistent feel when inserted and extracted from its corresponding receptacle connector. Additionally, plug connectors according to the present invention have external contacts instead of internal contacts and thus do not include a cavity that is prone to collecting and trapping debris.

In one embodiment, a plug connector includes a body and a connector tab connected to and extending longitudinally away from the body. The connector tab has first and second major opposing sides and third and fourth opposing sides that extend between the first and second major sides. A centrally located ground contact is formed on at least one of the first or second major sides of the connector tab and a plurality of signal contacts are carried by the connector tab including a first signal contact formed on the third side and a second signal contact formed on the fourth side. Additionally, the connector tab and contacts have 180 degree symmetry so that the plug connector can be inserted and operatively coupled to a corresponding receptacle connector in either of two orientations.

In other embodiments, a receptacle connector according to the present invention includes a housing with an interior cavity having a tabular cross section. The interior cavity has a plurality of contacts arranged around a periphery of the interior cavity and a plurality of ground contacts arranged within the interior cavity. The cavity may also contain a retention feature that is part of a retention mechanism that interacts with another retention feature on a corresponding connector. In some embodiments, sensors are included within the cavity to detect the orientation of a corresponding connector upon insertion into the connector receptacle that communicate with software and hardware to switch at least one of the pluralities of contacts of the receptacle connector based on the orientation of the corresponding connector upon insertion.

To better understand the nature and advantages of the present invention, reference should be made to the following description and the accompanying figures. It is to be understood, however, that each of the figures is provided for the purpose of illustration only and is not intended as a definition of the limits of the scope of the present invention.

BRIEF DESCRIPTION OF THE DRAWINGS

FIG. 2A shows a perspective view of a previously known micro-USB plug connector while

FIGS. 6A-6D are simplified perspective and plan views of connector 190 with chamfered edges at its base;

FIG. 7A is a simplified perspective view of a connector jack 400 corresponding to plug connectors 190 while

FIG. 7C is a bottom plan view of connector jack 400 shown in FIG. 7A while

DETAILED DESCRIPTION OF THE INVENTION

Embodiments of the present invention pertain to connectors, such as dual orientation audio connectors with side audio contacts that can be used in place of the standard TRS or TRRS connectors. These connectors may be suitable for a multiplicity of electronic devices, including any device with audio out signals (e.g., radio, landline phone, stereo). In some embodiments, the invention is particularly well suited for portable electronic media devices.

As used herein, an electronic media device includes any device with at least one electronic component that may be used to present human-perceivable media. Such devices may include, for example, portable music players (e.g., Apple's iPod devices), portable video players (e.g., portable DVD players), cellular telephones (e.g., Apple's iPhone devices), video cameras, digital still cameras, projection systems (e.g., holographic projection systems), gaming systems, PDAs, desktop computers, as well as tablet or other mobile computers (e.g., Apple's iPad devices). Some of these devices may be configured to provide audio, video or other sensory output.

Figure 1A:
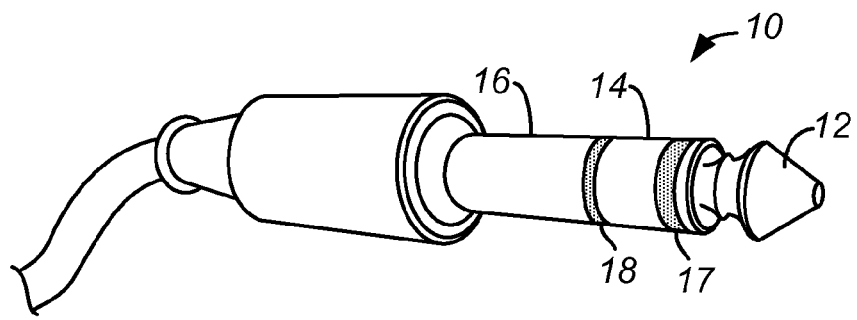
FIGS. 1A and 1B show perspective views of previously known TRS audio plug connectors.
Figure 1B:
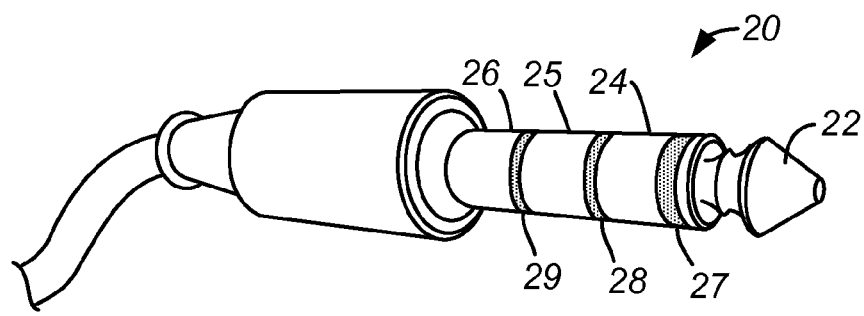
Figure 2A:
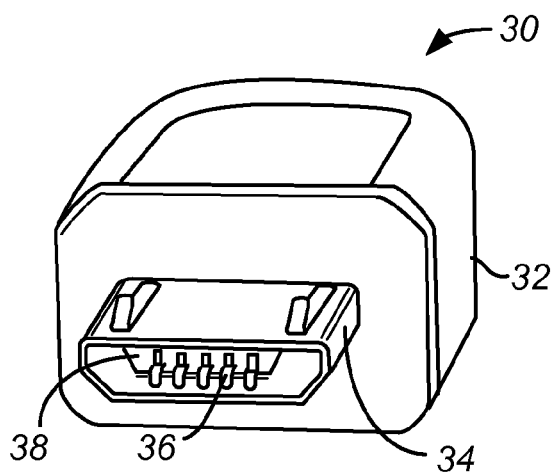
Figure 2B:
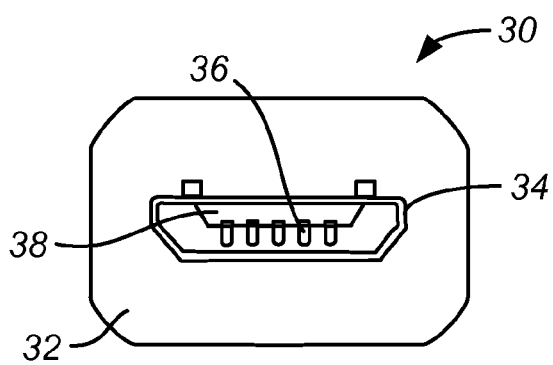
FIG. 2B shows a front plan view of the micro-USB connector shown in FIG. 2A.
Figure 3:
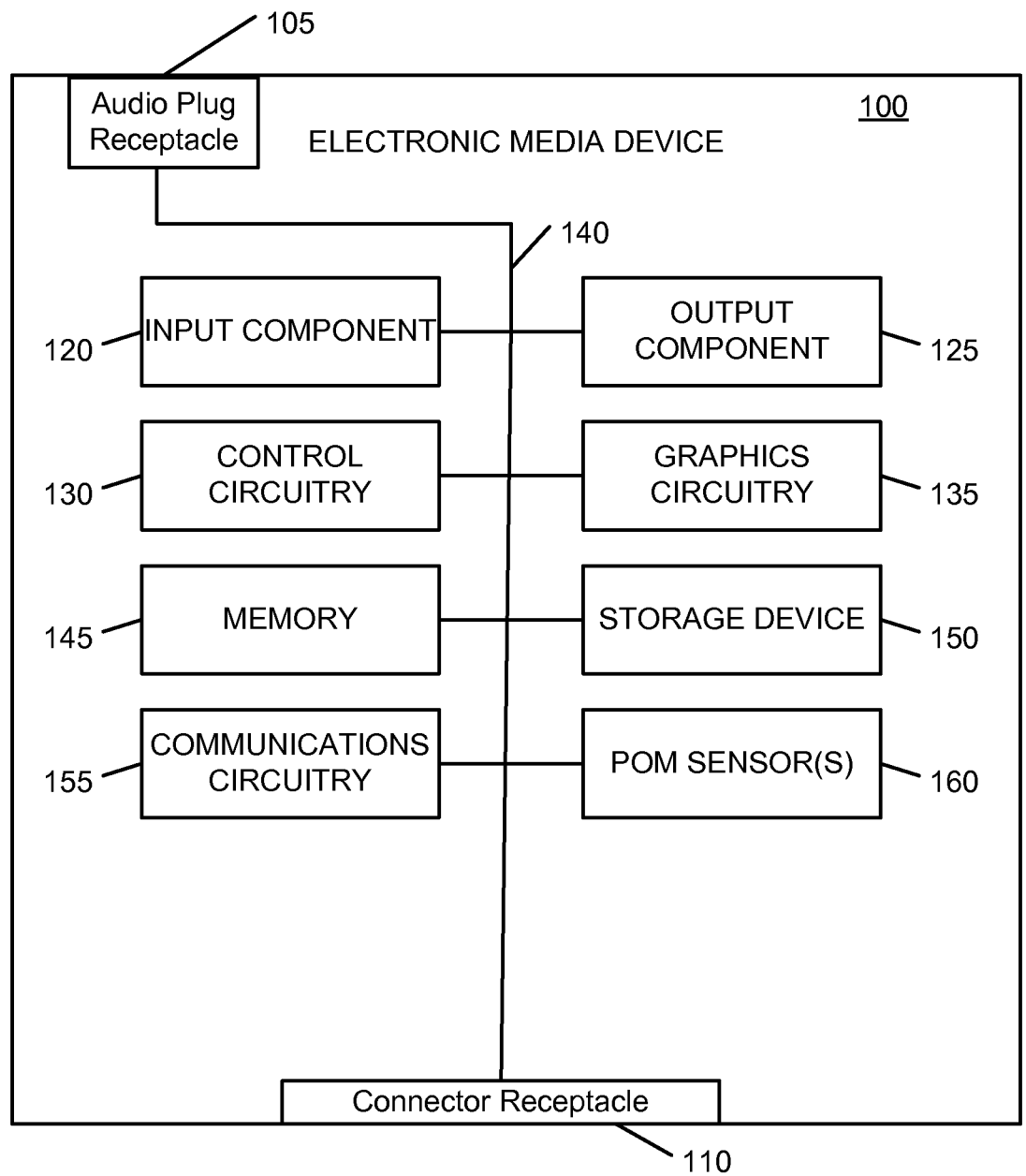
FIG. 3 is a simplified illustrative block diagram of an electronic media device suitable for use with embodiments of the present invention.

FIG. 3 is a simplified illustrative block diagram representing an electronic media device 100 that includes an audio plug receptacle 105 according to embodiments of the present invention. Electronic media device 100 may also include, among other components, connector receptacle 110, one or more user input components 120, one or more output components 125, control circuitry 130, graphics circuitry 135, a bus 140, a memory 145, a storage device 150, communications circuitry 155 and POM (position, orientation or movement sensor) sensors 160. Control circuitry 130 may communicate with the other components of electronic media device 100 (e.g., via bus 140) to control the operation of electronic media device 100. In some embodiments, control circuitry 130 may execute instructions stored in a memory 145. Control circuitry 130 may also be operative to control the performance of electronic media device 100. Control circuitry 130 may include, for example, a processor, a microcontroller and a bus (e.g., for sending instructions to the other components of electronic media device 100). In some embodiments, control circuitry 130 may also drive the display and process inputs received from input component 120.

Memory 145 may include one or more different types of memory that may be used to perform device functions. For example, memory 145 may include cache, flash memory, ROM, RAM and hybrid types of memory. Memory 145 may also store firmware for the device and its applications (e.g., operating system, user interface functions and processor functions). Storage device 150 may include one or more suitable storage mediums or mechanisms, such as a magnetic hard drive, flash drive, tape drive, optical drive, permanent memory (such as ROM), semi-permanent memory (such as RAM) or cache. Storage device 150 may be used for storing media (e.g., audio and video files), text, pictures, graphics, advertising or any suitable user-specific or global information that may be used by electronic media device 100. Storage device 150 may also store programs or applications that may run on control circuitry 130, may maintain files formatted to be read and edited by one or more of the applications and may store any additional files that may aid the operation of one or more applications (e.g., files with metadata). It should be understood that any of the information stored on storage device 150 may instead be stored in memory 145.

Electronic media device 100 may also include input component 120 and output component 125 for providing a user with the ability to interact with electronic media device 100. For example, input component 120 and output component 125 may provide an interface for a user to interact with an application running on control circuitry 130. Input component 120 may take a variety of forms, such as a keyboard/keypad, trackpad, mouse, click wheel, button, stylus or touch screen. Input component 120 may also include one or more devices for user authentication (e.g., smart card reader, fingerprint reader or iris scanner) as well as an audio input device (e.g., a microphone) or a video input device (e.g., a camera or a web cam) for recording video or still frames. Output component 125 may include any suitable display, such as a liquid crystal display (LCD) or a touch screen display, a projection device, a speaker or any other suitable system for presenting information or media to a user. Output component 125 may be controlled by graphics circuitry 135. Graphics circuitry 135 may include a video card, such as a video card with 2D, 3D or vector graphics capabilities. In some embodiments, output component 125 may also include an audio component that is remotely coupled to electronic media device 100. For example, output component 125 may include a headset, headphones or ear buds that may be coupled to electronic media device 100 with a wire or wirelessly (e.g., Bluetooth headphones or a Bluetooth headset).

Electronic media device 100 may have one or more applications (e.g., software applications) stored on storage device 150 or in memory 145. Control circuitry 130 may be configured to execute instructions of the applications from memory 145. For example, control circuitry 130 may be configured to execute a media player application that causes full-motion video or audio to be presented or displayed on output component 125. Other applications resident on electronic media device 100 may include, for example, a telephony application, a GPS navigator application, a web browser application and a calendar or organizer application. Electronic media device 100 may also execute any suitable operating system, such as a Mac OS, Apple iOS, Linux or Windows and can include a set of applications stored on storage device 150 or memory 145 that is compatible with the particular operating system.

In some embodiments, electronic media device 100 may also include communications circuitry 155 to connect to one or more communications networks. Communications circuitry 155 may be any suitable communications circuitry operative to connect to a communications network and to transmit communications (e.g., voice or data) from electronic media device 100 to other devices within the communications network. Communications circuitry 155 may be operative to interface with the communications network using any suitable communications protocol such as, for example, Wi-Fi (e.g., a 802.11 protocol), Bluetooth, high frequency systems (e.g., 900 MHz, 2.4 GHz and 5.6 GHz communication systems), infrared, GSM, GSM plus EDGE, CDMA, quadband and other cellular protocols, VoIP or any other suitable protocol.

In some embodiments, communications circuitry 155 may be operative to create a communications network using any suitable communications protocol. Communications circuitry 155 may create a short-range communications network using a short-range communications protocol to connect to other devices. For example, communications circuitry 155 may be operative to create a local communications network using the Bluetooth protocol to couple with a Bluetooth headset (or any other Bluetooth device). Communications circuitry 155 may also include a wired or wireless network interface card (NIC) configured to connect to the Internet or any other public or private network. For example, electronic media device 100 may be configured to connect to the Internet via a wireless network, such as a packet radio network, an RF network, a cellular network or any other suitable type of network. Communication circuitry 145 may be used to initiate and conduct communications with other communications devices or media devices within a communications network.

Electronic media device 100 may also include any other component suitable for performing a communications operation. For example, electronic media device 100 may include a power supply, an antenna, ports or interfaces for coupling to a host device, a secondary input mechanism (e.g., an ON/OFF switch) or any other suitable component.

Electronic media device 100 may also include POM sensors 160. POM sensors 160 may be used to determine the approximate geographical or physical location of electronic media device 100. As described in more detail below, the location of electronic media device 100 may be derived from any suitable trilateration or triangulation technique, in which case POM sensors 160 may include an RF triangulation detector or sensor or any other location circuitry configured to determine the location of electronic media device 100.

POM sensors 160 may also include one or more sensors or circuitry for detecting the position orientation or movement of electronic media device 100. Such sensors and circuitry may include, for example, single-axis or multi-axis accelerometers, angular rate or inertial sensors (e.g., optical gyroscopes, vibrating gyroscopes, gas rate gyroscopes or ring gyroscopes), magnetometers (e.g., scalar or vector magnetometers), ambient light sensors, proximity sensors, motion sensor (e.g., a passive infrared (PIR) sensor, active ultrasonic sensor or active microwave sensor) and linear velocity sensors. For example, control circuitry 130 may be configured to read data from one or more of POM sensors 160 in order to determine the location orientation or velocity of electronic media device 100. One or more of POM sensors 160 may be positioned near output component 125 (e.g., above, below or on either side of the display screen of electronic media device 100).

Figure 4:
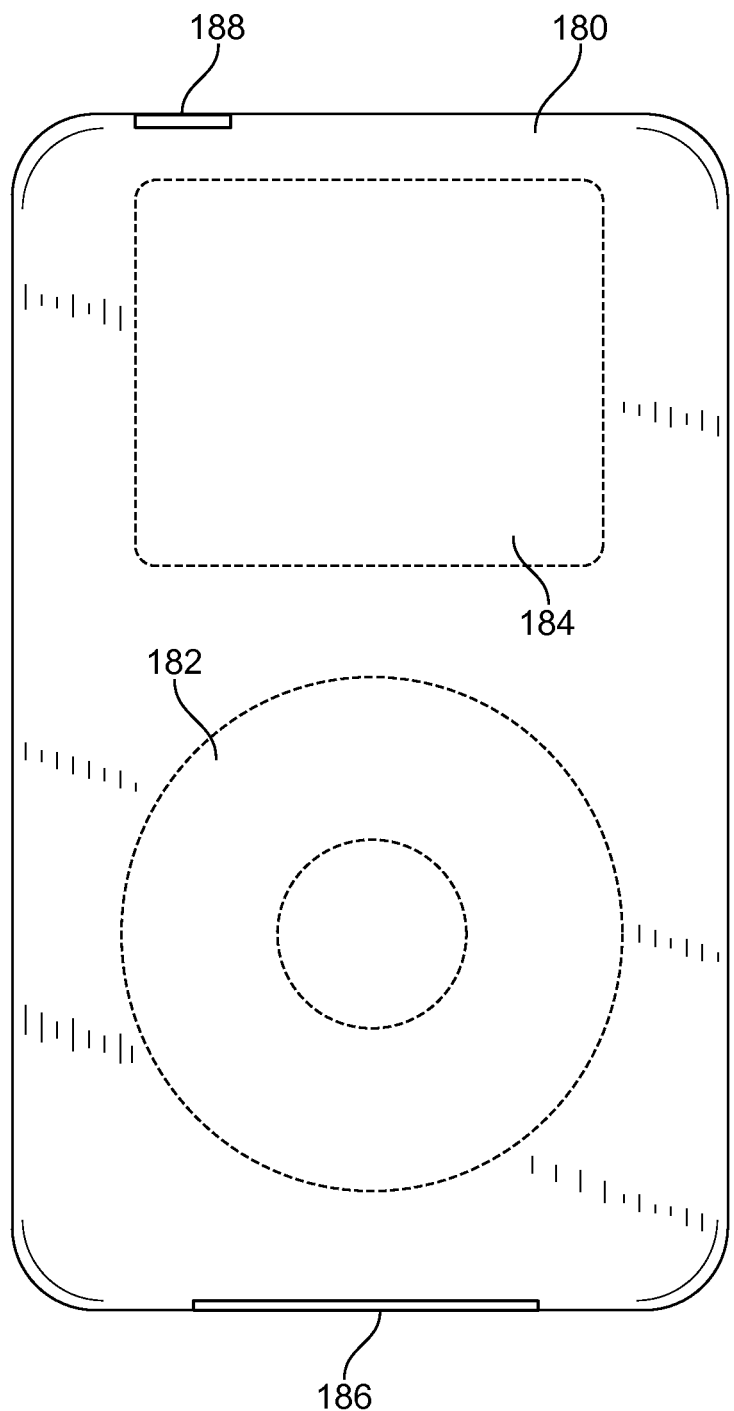
FIG. 4 depicts an illustrative rendering of one particular embodiment of an electronic media device suitable for use with embodiments of the present invention.

FIG. 4 depicts an illustrative rendering of one particular electronic media device 180. Device 180 includes a click wheel 182 as an input component and an LED display 184 as an output component. Device 180 also includes connector receptacle 186 and audio plug receptacle 188. For simplicity, various internal components, such as the control circuitry, graphics circuitry, bus, memory, storage device and other components are not shown in FIG. 4. Some embodiments of the invention are directed towards an audio connector and are particularly suitable for mating with receptacle connector 188. Other embodiments of the invention are directed towards data connectors and may be particularly useful for mating with receptacle connector 186.

Figure 5A:
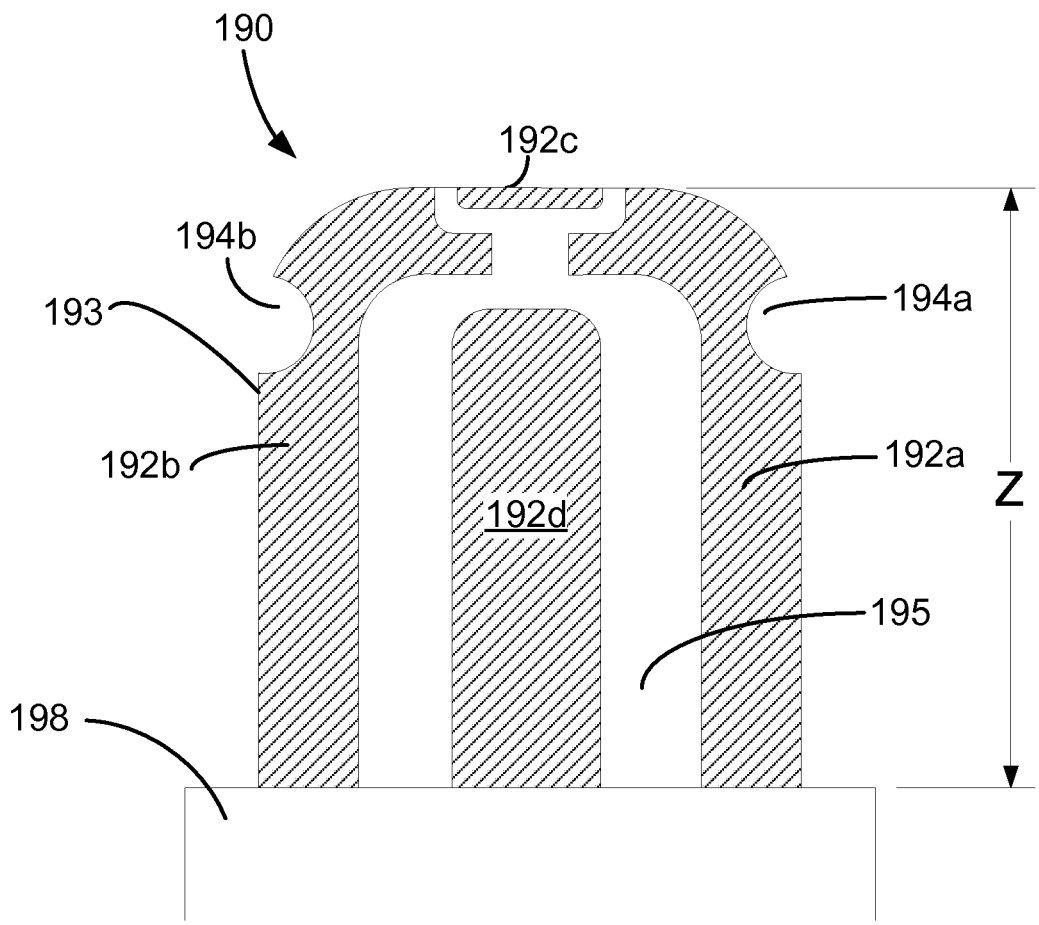
FIGS. 5A and 5B are simplified top and front views, respectively, of connector 190 according to one embodiment of the present invention.
Figure 5B:
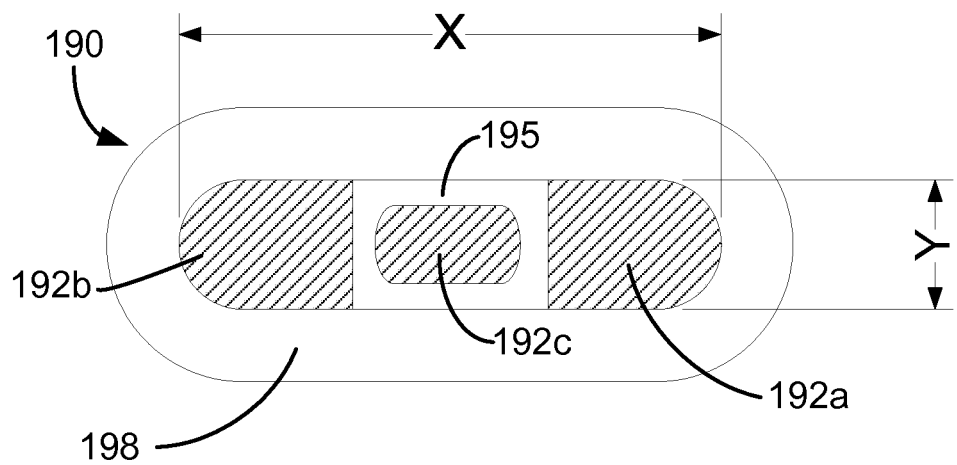

In order to better appreciate and understand the present invention, reference is made to FIGS. 5A and 5B which depict various views of a first embodiment of an audio plug connector 190 according to the present invention. Specifically, FIGS. 5A and 5B are simplified top and front views, respectively, of connector 190 according to an embodiment of the present invention. As shown in FIGS. 5A and 5B, connector 190 includes a connector tab or tongue 193 that extends out of and longitudinally away from a body 198. Tab 193 includes two symmetrical and electrically isolated conductive sections 192a, 192b around its outer periphery which can function as signal contacts (as opposed to ground or power contacts) in one embodiment. In one particular embodiment contact 192a is a left audio out contact and contact 192b is a right audio out contact. A microphone contact 192c is positioned at the distal tip of the connector and ground contacts 192d, one on each of the two major opposing sides, are positioned between the left and right audio contacts 192a and 192b. An overmolded dielectric fill 195 separates the electrical contacts and retention features 194a and 194b, shown as notches in FIG. 5A, formed on the sides of contacts 192a, 192b which can be used as part of a retention mechanism. All the aforementioned elements make up the connector tab, which is connected to body 198 at the base of the connector tab as shown in FIGS. 5A and 5B. In some embodiments body 198 may be thicker than the connector tab (e.g., as shown in FIGS. 5A and 5B), while in other embodiments the tab and body may have substantially the same thickness.

As shown in FIGS. 5A and 5B, contacts 192a-192d are external contacts and connector 190 does not include an exposed cavity in which particles and debris may collect. To improve robustness and reliability, connector 190 is fully sealed and includes no moving parts. Furthermore, connector 190 has a considerably reduced insertion depth as compared to commonly available TRS and TRRS connectors described above. In one particular embodiment, the connector tab of connector 190 has a width, X, of about 4.1 mm; a thickness, Y, of about 1.5 mm; and an insertion depth, Z, of about 5.5 mm. In another embodiment, the connector tab of connector 190 has a width, X, of about 4.1 mm; a thickness, Y, of about 1.5 mm; and an insertion depth, Z, of about 5.75 mm.

Figure 5C:
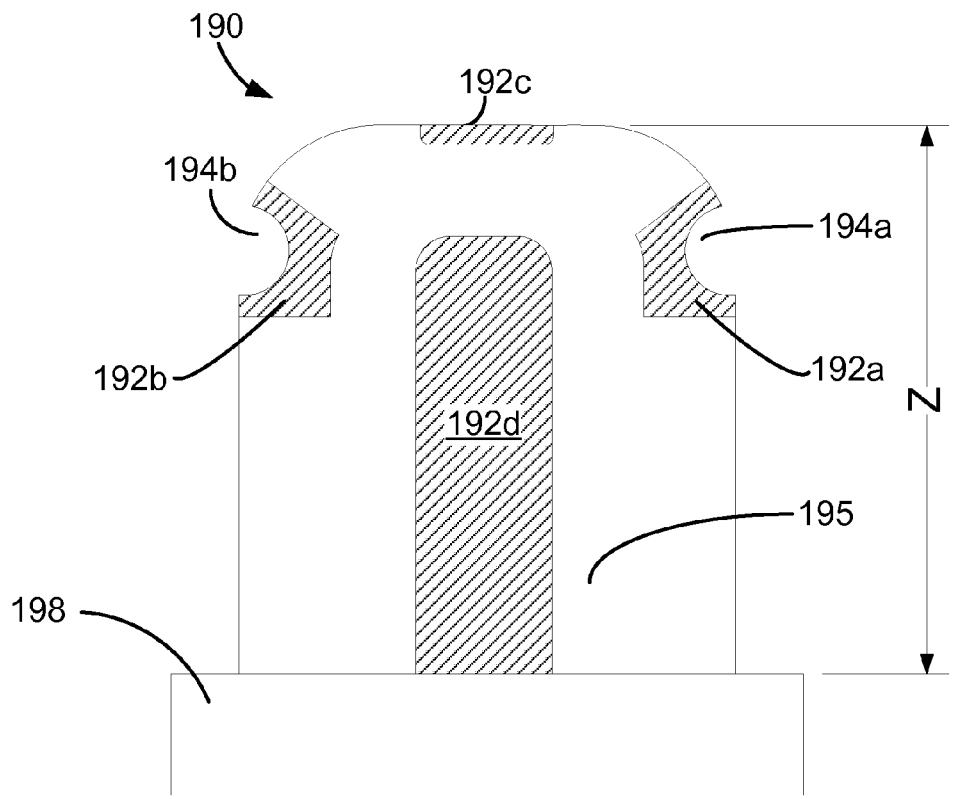
FIGS. 5C and 5D are simplified top views of connector 190 according additional embodiments of the present invention.
Figure 5D:
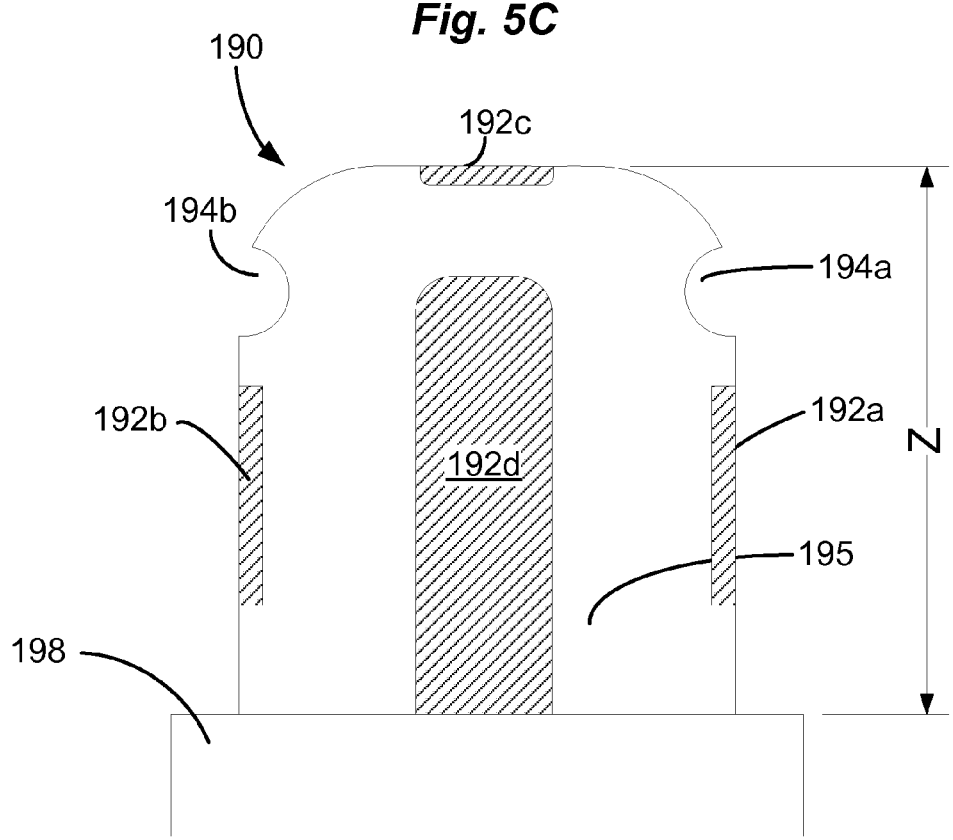

Contacts 192a-192d can be made from a copper, nickel, brass, a metal alloy or any other appropriate conductive material. Contacts 192a-192d are spaced and tab 193 is shaped so as to provide 180 degree symmetry so that plug connector 190 can be inserted into a corresponding receptacle connector (shown in FIGS. 7A-7D) in either of two orientations as discussed below. In some embodiments, contacts 192a and 192b may be a fraction of their relative sizes shown in FIG. 5A, while still positioned so as to provide 180 degree symmetry for plug connector 190 (e.g., contacts 192a and 192b as shown in FIG. 5D). In one particular embodiment, contacts 192a and 192b may be formed to include and surround a small region about retention features 194a and 194b and are positioned so as to provide 180 degree symmetry for plug connector 190 (e.g., contacts 192a and 192b as shown in FIG. 5C).

In the engaged position, each of contacts 192a-192d is in electrical contact with a corresponding contact in the receptacle connector. Connector 190 has a 180 degree symmetrical, dual orientation design which enables the connector to be inserted into a connector jack with either of the two major opposing sides on top. As previously discussed, the two audio contacts 192a and 192b are located on opposite sides of the connector. In this manner, an audio contact is always on the right and left side of the connector, microphone contact 192c is always positioned at the distal tip of the connector, and ground contacts 192d, one on each of the two major opposing sides, are always in the same position regardless of the orientation. A sensing circuit in the receptacle connector or the electronic device in which the receptacle connector is housed may detect the orientation of connector 190 and switch internal connections to the contacts corresponding to contacts 192a and 192b in the connector jack as described below with respect to FIGS. 8A and 8B.

Two retention features 194a and 194b, shown as semicircular notches in FIG. 5A, are formed in contacts 192a and 192b, respectively, and located on opposing sides of the connector tab near its distal end. In operation, connector 190 is inserted into a receptacle connector (shown in FIG. 7A) until retention features 194a and 194b, e.g., notches, operatively engage with a retention mechanism, such as a cantilevered spring or detent as described with respect to FIGS. 7A-7D. The depth and position of retention features 194a and 194b are selected to provide specific insertion and extraction forces such that the retention force required to insert connector 190 into a connector jack (shown in FIG. 7A) is higher than the extraction force required to remove the connector from the connector jack. The inventors have determined that positioning the retention features 194a and 194b and corresponding latching mechanism (shown in FIGS. 7B-7D) near the distal end of connector 190 helps to better secure the connector 190 sideways when it is in an engaged position within a connector jack (shown in FIG. 7C). For example, in some embodiments, the retention features or notches may be located on the distal third of the connector tab. In other embodiments, other retention mechanisms can be used such as mechanical or magnetic latches or orthogonal insertion mechanisms, which may or may not require the presence of retention features 194a and 194b (e.g., notches).

FIGS. 6A-6D are simplified perspective and plan views of connector 190 with chamfered edges at its base. Chamfered edge 199 connects body 195 to the tab portion of connector 190. Body 195 may also be stiffened to increase its strength in a side-load condition. For example, body 195 may have a thicker base portion underneath its outer surface. To compensate for the chamfered edge, without modifying the insertion depth, Z, of connector 190, each of contacts 192a, 192b and 192d shown in FIG. 6A may have a reduced length as compared to how they are shown in FIG. 5A.

Figure 7A:
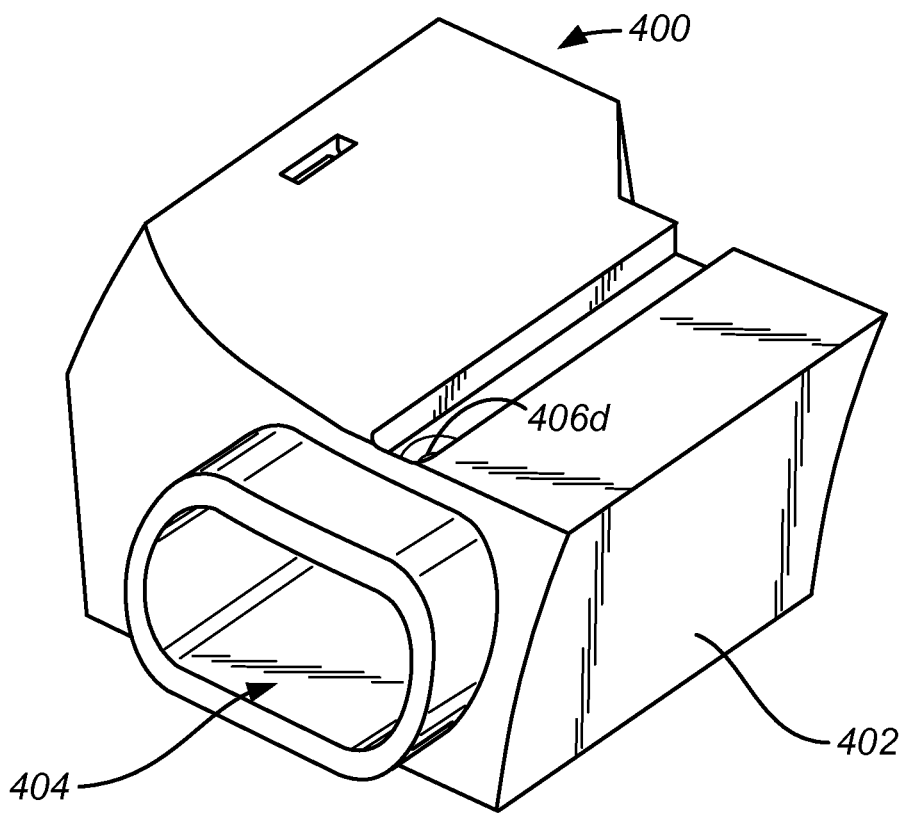
Figure 7B:
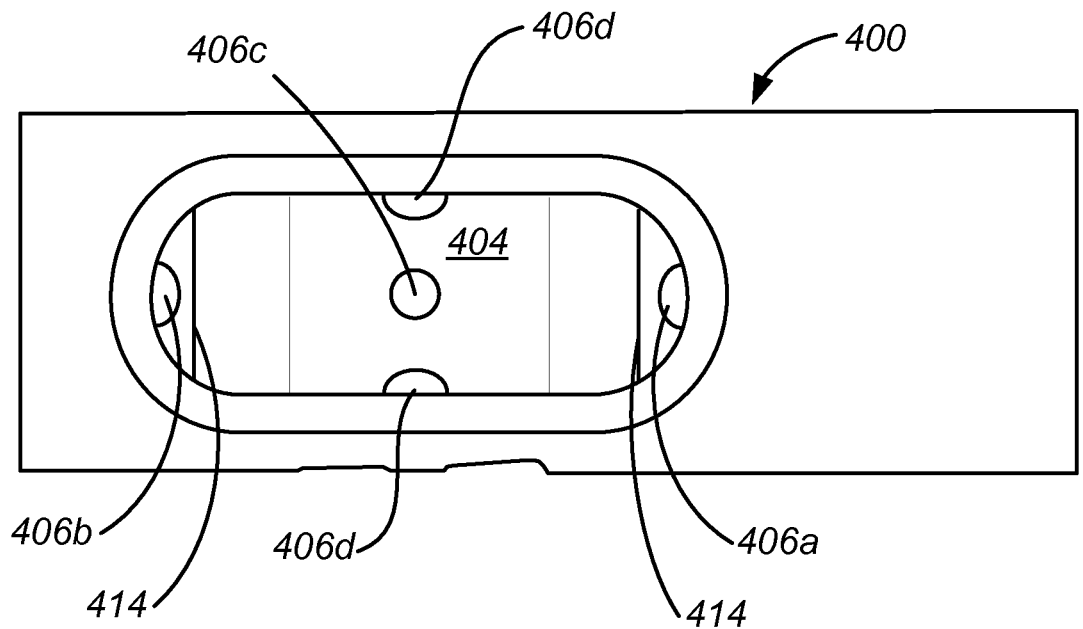
FIG. 7B is a front view of connector jack 400.

Reference is now made to FIG. 7A, which is a simplified perspective view of a receptacle connector 400 that can be used in conjunction with certain plug connectors of the present invention, and FIG. 7B is a front view of receptacle connector 400. Connector jack 400 includes a housing 402 that defines an interior cavity 404 into which connector 190 can be inserted. Also shown in FIG. 7A are contacts 406d that may be electrically coupled to ground contacts 192d (shown in FIG. 5A) regardless of the insertion orientation of connector 190. Contacts 406a-406b are also present at the sides of cavity 404 and correspond to plug connector contacts 192a-192b, respectively, while a contact 406c is present at the back of cavity 400 and positioned to couple to contact 192c. Connector jack 400 is designed to be waterproof so as to not allow ingress of moisture into whatever electronic device the connector is housed within.

Figure 7C:
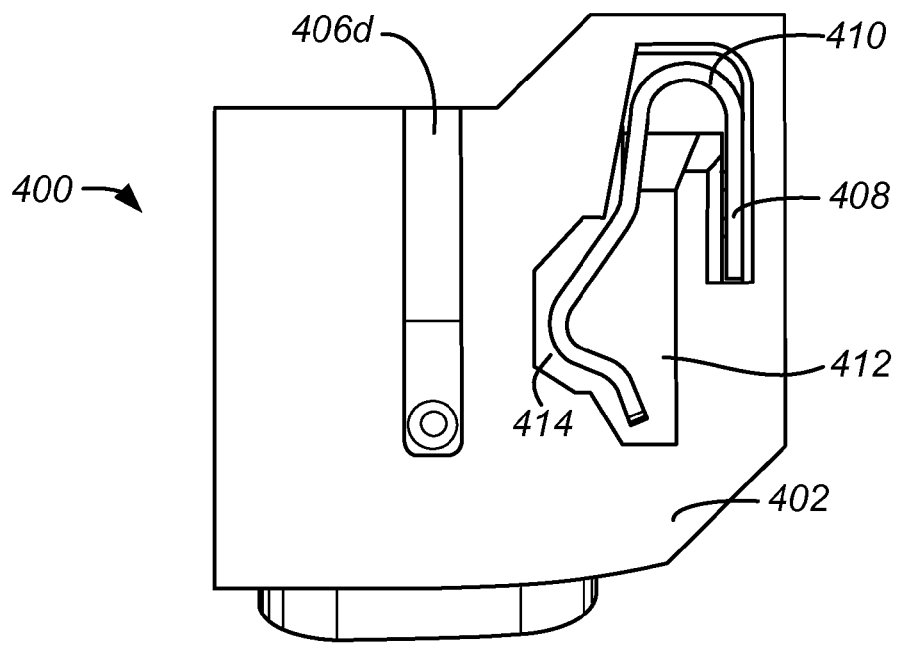
Figure 7D:
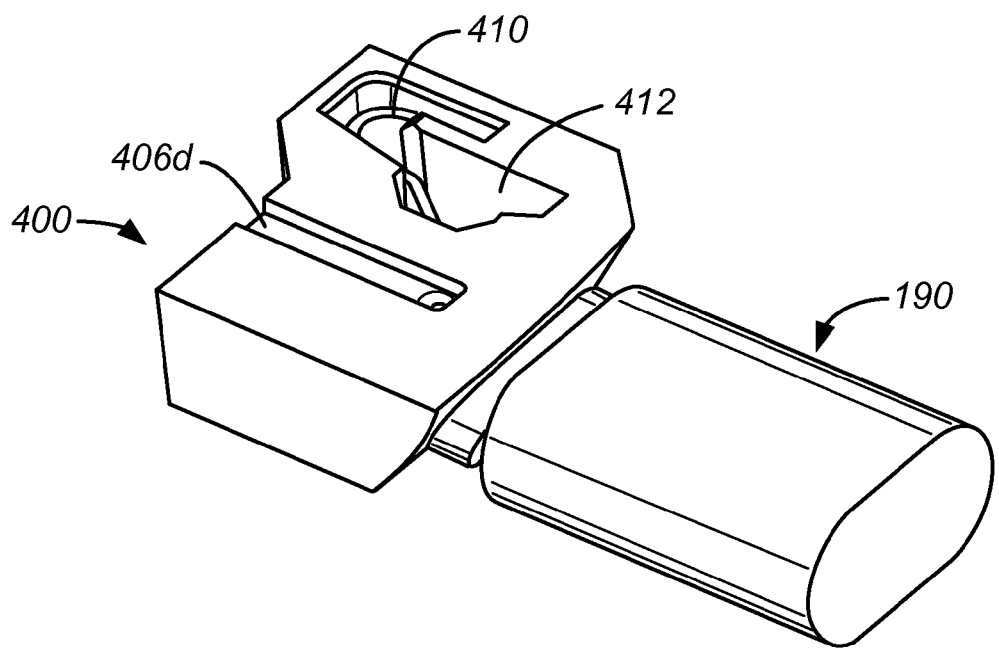
FIG. 7D is a simplified perspective view showing plug connector 190 inserted into connector jack 400.

An opening (not visible in FIG. 7B) within the interior of cavity 404 allows tip 414 of spring-loaded retention mechanism 408 (shown in FIG. 7C) to protrude into cavity 404. As shown in FIG. 7C, which is a bottom plan view of connector jack 400, retention mechanism 408 includes a spring 410 positioned in a cut-out section 412 of housing 402. Spring 410 is pre-loaded so that tip 414 extends through an opening between cut-out section 412 and cavity 404. When plug connector 190 is inserted into cavity 404, tip 414 latches with either notch 194a or 194b of the connector depending on its insertion orientation. In some embodiments, a second retention mechanism 408 can also be positioned within housing 402 so that there is a retention mechanism 408 on the left and right side of connector 190 (tip 414 of both retention mechanisms 408 are shown in FIG. 7B). As previously discussed, retention features 194a, 194b are located near the distal end of connectors 190 to better secure the connector sideways when it is in an engaged position within connector jack 400. Furthermore, the rounded bulbous shape of retention features 194a, 194b may match the rounded shape of tip 414 of spring 410 to provide a comfortable click feel when the spring engages with the retention features. FIG. 7D shows plug connector 190 inserted into connector jack 400 so that one of notches 194a, 194b are engaged with spring 410. As previously discussed, in other embodiments, other retention mechanisms can be used such as mechanical or magnetic latches or orthogonal insertion mechanisms.

Figure 8A:
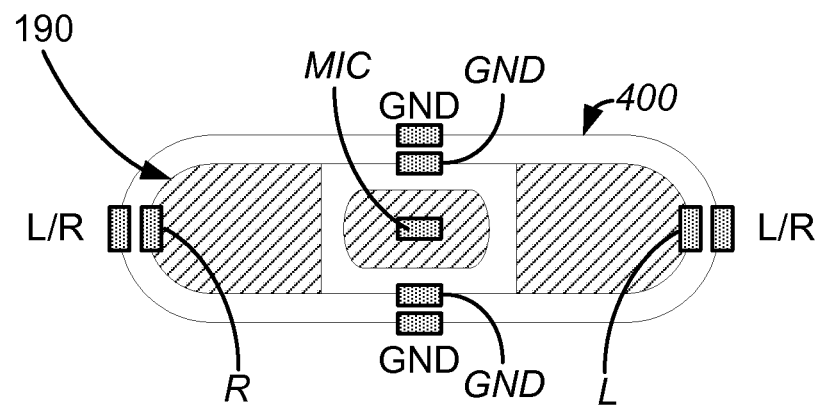
FIGS. 8A and 8B illustrate the alignment of the contacts of plug connector 190 against that of connector jack 400 when mated according to two different insertion orientations.
Figure 8B:
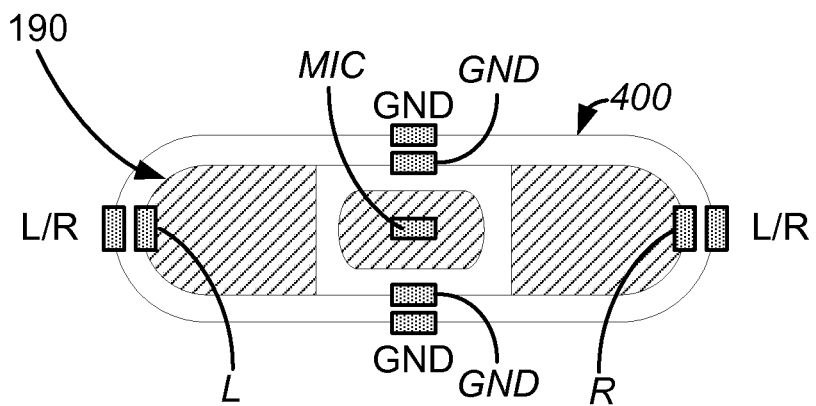

FIGS. 8A-8B illustrate the alignment of the contacts of plug connector 190 against that of connector jack 400 when mated according to both insertion orientations. As discussed previously, connector 190 has two symmetrical and electrically isolated halves which may function as left and right audio contacts 192a, 192b. A microphone contact 192c is positioned at the distal tip of the connector and ground contacts 192d, one on each of the two major opposing sides, are positioned between the left and right audio contacts. When connector 190 is engaged within a matching connector jack 400, connector jack 400 detects the orientation of connector 190 (orientations shown in FIG. 8A and FIG. 8B) to set software and/or hardware switches to properly match the left and right audio contacts of connector jack 400 to the left and right audio contacts of connector 190. For example, a software switch can be used to switch the connector jack's left and right audio contacts depending on the insertion orientation or a hardware switch can be used to switch the left and right audio contacts of the connector jack to match the contacts of connector 190. This may be implemented for use with either corresponding connector 190. For example, a software switch can be used to switch the receptacle jack's contacts for left and right audio depending on the insertion orientation while a hardware switch can be used to switch the connector jacks microphone and ground contacts to match the contacts of connector 190. In other embodiments, both switches can be implemented in software or both switches can be implemented in hardware. In another example, the orientation of the connector can instead be detected by circuitry associated with the corresponding receptacle connector based on signals received over the contacts. As one example, upon inserting a connector within a receptacle connector of a host device, the host device may send an Acknowledgment signal to the serial control chip over the contact in the receptacle connector designated for the specific contact and waits for a Response signal. If a Response signal is received, the contacts are aligned properly and audio and other signals can be transferred between the connectors. If no response is received, the host device flips the signals to correspond to the second possible orientation (i.e., flips the signals 180 degrees) and repeats the Acknowledgement/Response signal routine. In another embodiment, a physical orientation key (e.g., a unique notch or other physical features) formed on the plug connector, can be detected by an orientation contact or other appropriate mechanism in the receptacle connector to determine the orientation of the plug, and a hardware or software switch can set the receptacle connector contacts as appropriate for left and right audio or other data contacts to correspond to the plug connector contacts.

Figure 9A:
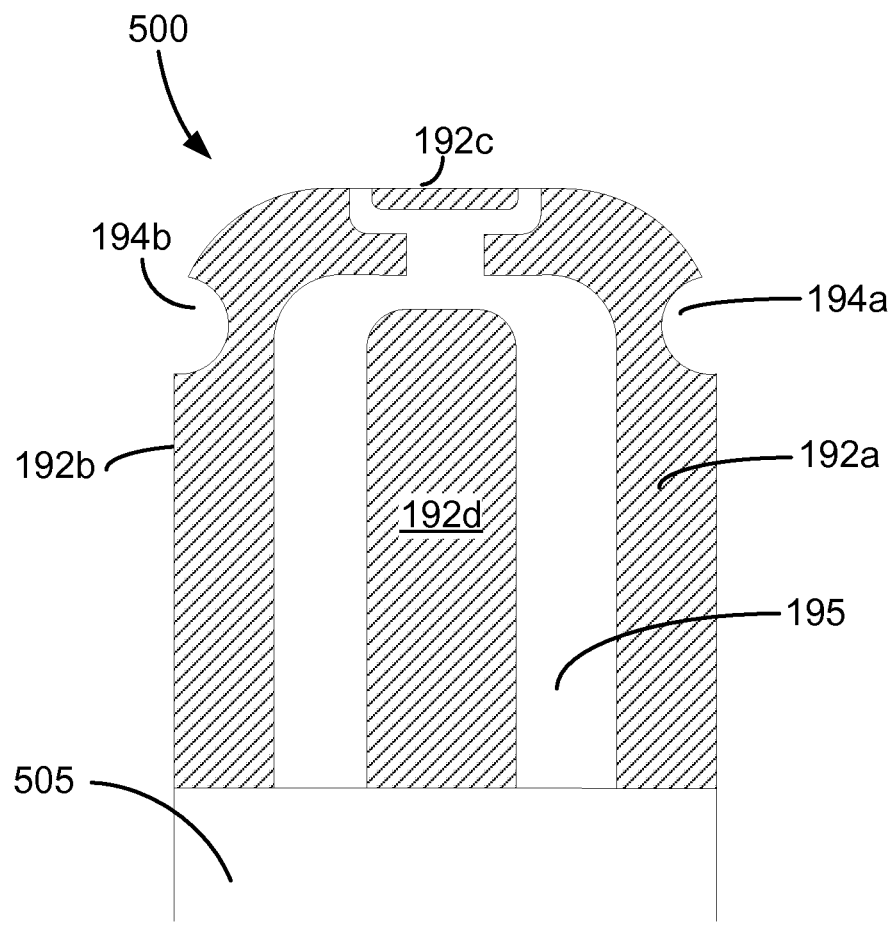
FIGS. 9A and 9B are simplified top and front views of connector 500 according to another embodiment of the present invention.
Figure 9B:
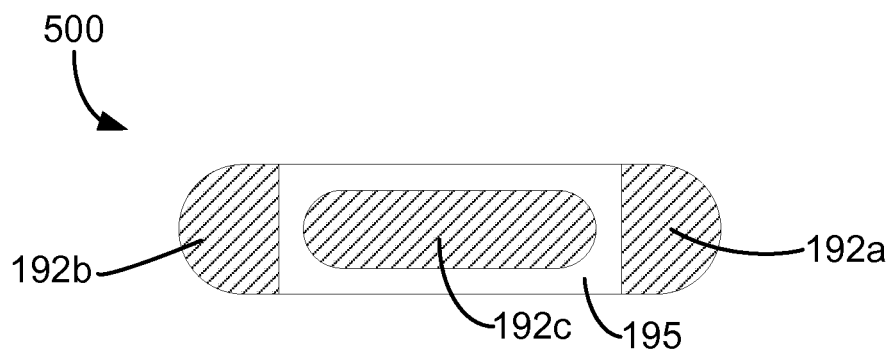

FIGS. 9A and 9B are simplified top and front views, respectively, of another embodiment of a dual-orientation connector according to the present invention. As shown in FIGS. 9A and 9B, the entirety of dual-orientation connector 500 is substantially flat. That is, body 505 of the connector has the same thickness and width as the connector tab of connector 500.

Figure 10:
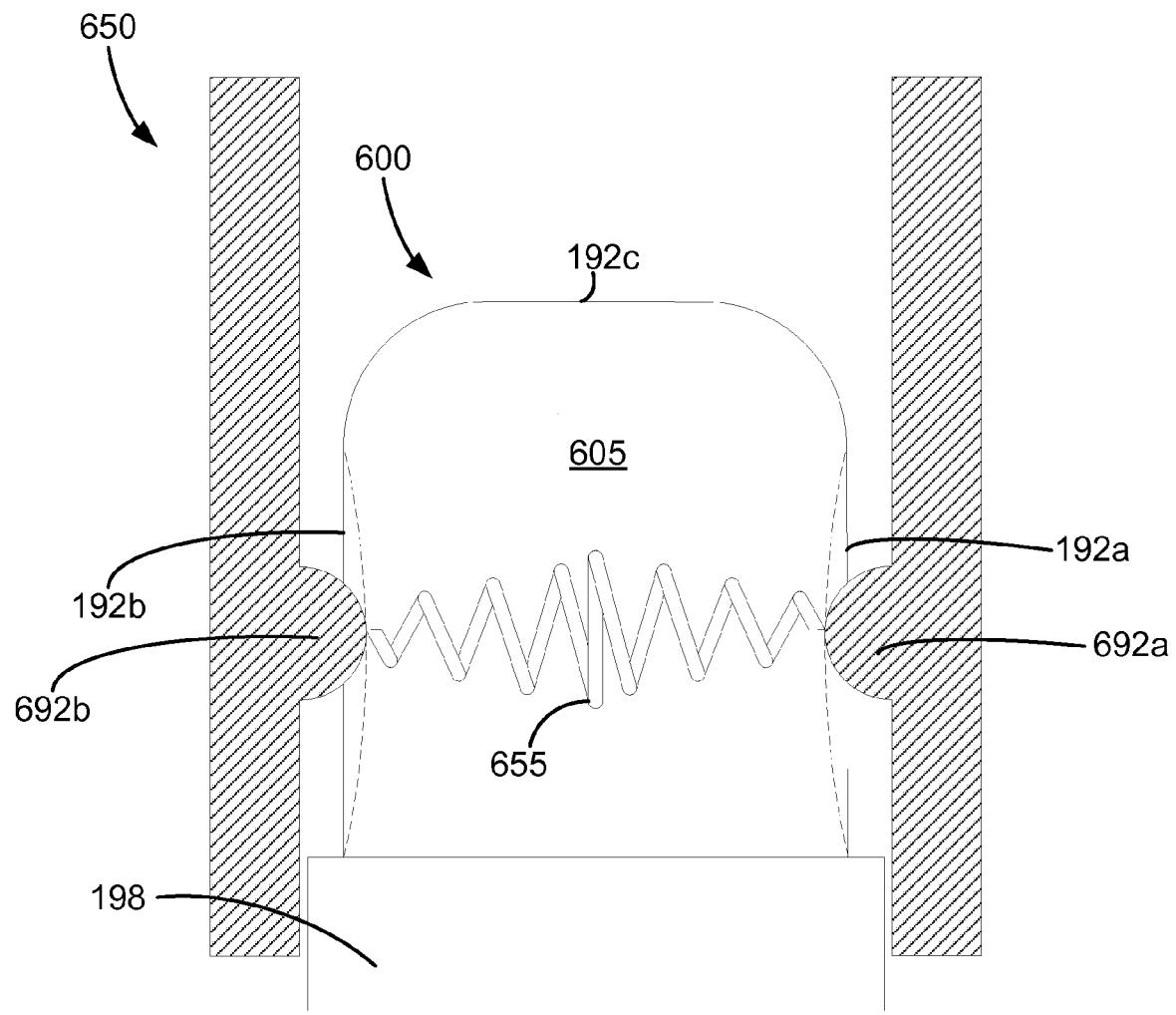
FIG. 10 is a simplified cross-sectional view of connector 600 according to yet another embodiment of the present invention that is inserted into a corresponding connector jack.

In another embodiment, connector 600 according to the present invention includes a connector tab portion 605 substantially formed by a flexible elastomer dielectric material. FIG. 10 is a simplified cross-sectional view of yet another embodiment of a connector according to the present invention inserted into a corresponding connector jack. Connector 600 includes contacts 192a and 192b which are left and right electrically isolated conductive edge portions on the right and left sides of connector tab portion 605. When connector 600 is inserted in corresponding receptacle jack 650 (similar to connector jack 400 shown in FIG. 7A) contacts 192a and 192b are pressed inward by jack contacts 692a and 692b, which compresses connector tab portion 605 (represented schematically by spring 655) thereby providing a secure connection between the contacts in connector 600 and receptacle connector 650. Thus, the pressure to keep connector 600 within jack 650 comes from the flexible elastomeric material of connector 600 rather than from jack 650. Thus, when connector 600 is mated with a corresponding connector jack 650, tab portion 605 deflects inward (as represented by the dotted lines in FIG. 10) between contacts 192a and 192b, formed on opposing sides, exerting a pushing force on connector 600 that defines a retention force that must be overcome to extract connector 600 from jack 650. These embodiments typically may not require other retention features (e.g., those shown in FIGS. 5A and 5B), but some embodiments may still incorporate them. Although not clearly shown in FIG. 10, connector 600 is similar to connector 190 (shown in FIG. 5A) except for the differences discussed above. Accordingly, connector 600 includes a dielectric body and other contacts as found in connector 190.

Figure 11:
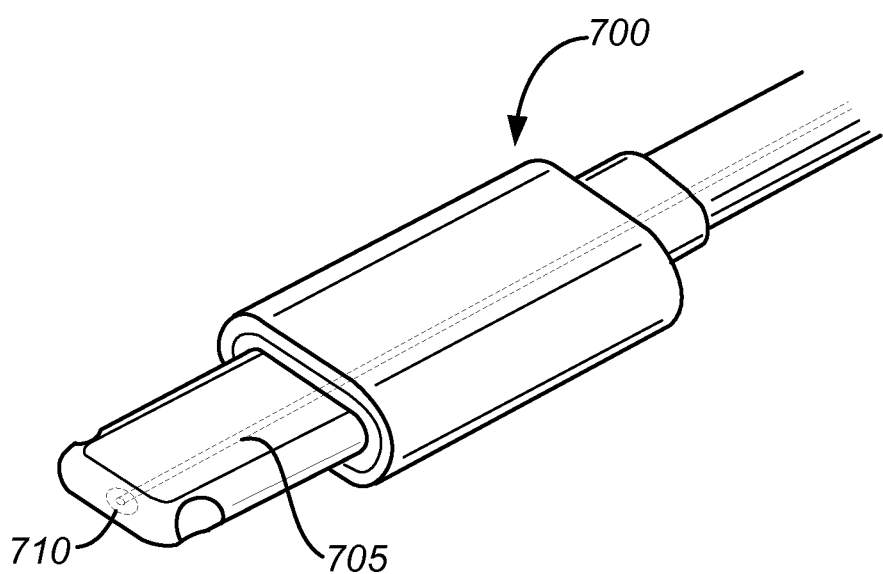
FIG. 11 illustrates one example of a connector 700 according to another embodiment of the present invention having a fiber optic cable that runs through the center of the connector.

Additionally, while the invention was described with respect to an audio connector, it is not limited to any particular type of signal and can be used to carry video and/or other signals instead of audio-related signals or in addition to audio-related signals. Also, in some embodiments, connectors according to the present invention can carry both analog and digital signals. As one example of a data connector according to an embodiment of the present invention, contacts 192a and 192b can be data contacts instead of audio contacts and contact 192c can be a power contact. As another example, any of the connectors discussed herein can be modified to include one or more fiber optic cables that extend through the connector and can be operatively coupled to receive or transmit optical data signals between a mating connector jack. FIG. 11 illustrates one example of a connector 700 which may have analog contacts (not shown in FIG. 11) as well as a fiber optic cable 705 that runs through the center of the connector. Analog contacts combined with fiber optic cable 705 may include contacts for left and right audio, microphone, power and ground (e.g., contacts 192a-192d shown in FIGS. 5A-5B). Fiber optic cable 705 allows for high data rate transmissions and can be used for USB 4.0 compatibility (e.g., 10 GB/second data transfer). With power, audio and data connections, connector 700 can be used to charge a device while simultaneously providing data and audio functions. Fiber optic cable 705 terminates at a lens 710 positioned at the distal end of the connector. Lens 710 can be made from a chemically strengthened aluminosilicate glass or a similar material that is highly resistant to scratching and is flush with the external surface of connector 710 (as shown in FIG. 11) to prevent debris build-up and abstraction of light.

Figure 12:
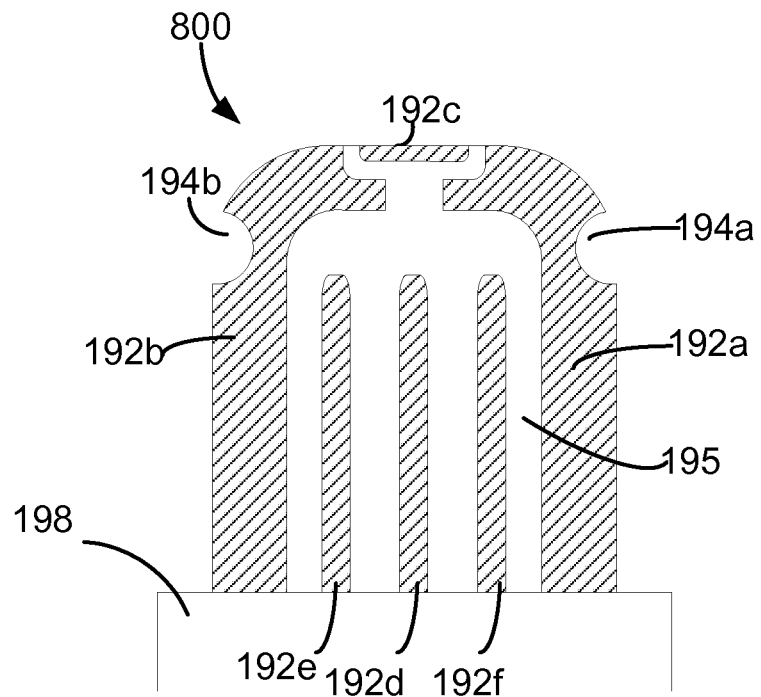
FIGS. 12 and 13 are simplified top views of connectors according to additional embodiments of the invention.

As another example, FIG. 12 illustrates a connector 800 according to another embodiment of the invention that includes contacts 192e and 192f on each side of ground contact 192d, along with similarly positioned contacts 192g and 192h on each side of the opposite side ground contact. Thus, connector 800 includes a total of seven signal contacts in addition to the two ground contacts. In one particular embodiment, the extra four contacts 192e-192f can be two pairs of differential data contacts for high speed data transfer. In another embodiment the extra four contacts can be used for video signals. Thus, the invention also includes many other signal transfer variations of the embodiments previously mentioned which may be accomplish by similar modifications.

Figure 13:
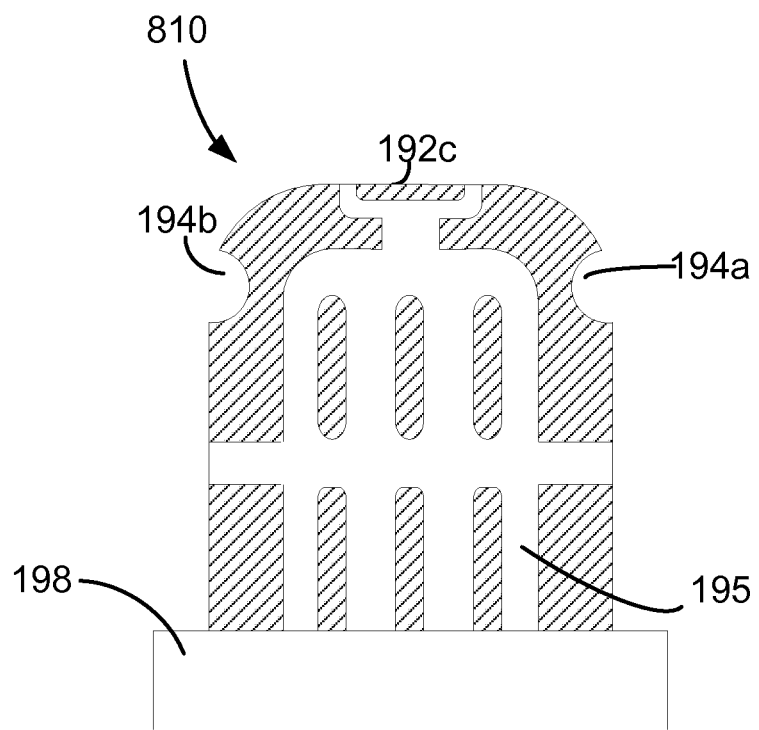

As will be understood by those skilled in the art, the present invention may be embodied in other specific forms without departing from the essential characteristics thereof. For example, while many embodiments of the invention discussed above included five contacts, the invention is not limited to any particular number of contacts. Some embodiments of the invention may have as few as two contacts while other embodiments can have thirty or even more contacts. As one additional example of another embodiment of the invention, FIG. 13 shows a plug connector 810 that includes twice the number of signal contacts as connector 800 by doubling the number of contacts along the length of the connector. That is, additional insulation separates contacts that are spaced apart from each other along the length of the connector just as insulation separates contacts spaced apart along the width of the connector. In other embodiments, the location of the left and right audio contacts, the microphone contact, and the ground contacts may be interchangeable and may require further design considerations related to the connector jack's contact configuration in order to properly mate. Those skilled in the art will recognize, or be able to ascertain, using no more than routine experimentation, many equivalents to the specific embodiments of the invention described herein. Such equivalents are intended to be encompassed by the following claims.

What is claimed is:

1. A plug connector comprising:
   a body;
   a connector tab connected to and extending longitudinally away from the body, the tab having first and second major opposing sides, and third and fourth opposing sides extending between the first and second major sides;
   a centrally located ground contact formed on at least one of the first or second major sides of the connector tab;
   a plurality of signal contacts carried by the connector tab, the plurality of signal contacts including a first signal contact formed on the third side and a second signal contact formed on the fourth side, wherein the connector tab and contacts have 180 degree symmetry so that the plug connector can be inserted and operatively coupled to a corresponding receptacle connector in either of two orientations.

2. The plug connector of claim 1 wherein the connector tab further comprises a metal contact at a distal end of the connector tab.

3. The plug connector of claim 2 wherein an outer shape of the connector tab is generally defined by the first, second, third and fourth sides.

4. The plug connector of claim 1 wherein the connector tab further comprises retention features formed on the third and fourth sides of the connector tab near its distal end.

5. The plug connector of claim 1 wherein the retention features comprise rounded notches formed in the third and fourth sides.

6. The plug connector of claim 1 wherein the connector tab comprises a chamfered portion at a proximal end so that the connector tab increases in diameter to match an outer profile of the body.

7. The plug connector of claim 1 wherein the body comprises a thermoplastic polymer molded over the base of the connector tab.

8. The plug connector of claim 7 wherein the body comprises an ABS outer body formed around the thermoplastic polymer.

9. The plug connector of claim 1 wherein the connector tab has a width of about 4.1 mm and a thickness of about 1.5 mm and wherein the connector tab has an insertion depth of about 5.5 mm.

10. The plug connector of claim 1 wherein the connector tab includes a centrally located ground contact on each of the first and second major sides of the connector tab.

11. The plug connector of claim 10 wherein the plurality of contacts comprises a left audio contact formed on the third side, a right audio contact formed on the fourth side, and a microphone contact formed at the distal end of the connector tab.

12. The plug connector of claim 4 wherein a retention force required to insert the plug connector into a corresponding receptacle connector is higher than an extraction force required to remove the plug connector from the receptacle connector.

13. The plug connector of claim 12 wherein the plug connector is an audio connector and the first contact is a left audio out contact and the second contact is a right audio out contact.

14. The plug connector of claim 1 wherein the connector tab includes a centrally located ground contact on each of the first and second major sides of the connector tab, and the plurality of contacts further includes third and fourth signal contacts positioned on each side of the ground contact on the first major side and fifth and sixth signal contacts positioned on each side of the ground contact on the second major side.

15. The plug connector of claim 1 wherein the plurality of contacts further includes a contact formed at the distal end of the connector tab.

16. The plug connector of claim 15 wherein an optic cable runs through the plug connector and terminates at a lens positioned at a distal end of the plug connector.

17. The plug connector of claim 16 wherein the lens is flush with an external surface of the plug connector.

18. The plug connector of claim 16 wherein the lens comprises a chemically strengthened aluminosilicate glass.

19. A plug connector comprising:
   a body;
   a connector tab having a base coupled to the body and a connector portion extending away from the base, the connector portion having an outer tip at a distal end and first and second major opposing sides; the connector tab further including left and right electrically isolated conductive edge portions surrounding an outer periphery of the connector tab except at its distal tip;
   a metal contact at a distal end of the connector tab between the left and right conductive edge portions;
   a centrally located ground contact formed on at least one of the first or second major sides of the connector tab;
   wherein an outer shape of the connector tab is defined by the left and right conductive edge portions, the metal contact at the distal end of the connector, the centrally located ground contact and a flexible elastomer dielectric material that fills space between the conductive ground ring and the metal contacts;
   wherein the flexible elastomer dielectric material forms a substantial portion of a body of the connector tab so that when the connector is mated with a corresponding receptacle connector the connector tab deflects inward between the left and right conductive edge portions exerting a force on contacts within the receptacle connector that defines a retention force that must be overcome to extract the plug connector from the receptacle connector.

20. The plug connector of claim 19 wherein the connector tab comprises five contacts including a left and right audio contact formed on the left and right electrically isolated conductive edge portions, a microphone contact formed on the metal contact at the distal end and the centrally located ground contacts formed on the first major side and the second major side of the connector tab.

21. A receptacle connector comprising:
   a housing,
   an interior cavity of the housing having a tabular cross section, the interior cavity having a plurality of contacts arranged around a periphery of the interior cavity and a plurality of ground contacts arranged within the interior cavity;
   wherein the interior cavity and contacts have 180 degree symmetry so that a corresponding plug connector can be inserted and operatively coupled to the receptacle connector in either of two orientations.

22. The receptacle connector of claim 21 further comprising one or more spring-loaded retention mechanisms with a tip that protrudes into the interior cavity to latch with a corresponding connector.

23. The receptacle connector of claim 22 wherein the tip has a rounded shape that latches with a matching bulbous notch on the corresponding connector.

24. The receptacle connector of claim 21 further comprising sensors to detect the orientation of a corresponding plug connector upon insertion into the plug connector into the receptacle connector and circuitry to switch at least some of the receptacle connector contacts based on the insertion orientation of the plug connector.

* * * * *